(No Model.)
W. N. FESSENDEN.
SNAP HOOK.
No. 398,599. Patented Feb. 26, 1889.
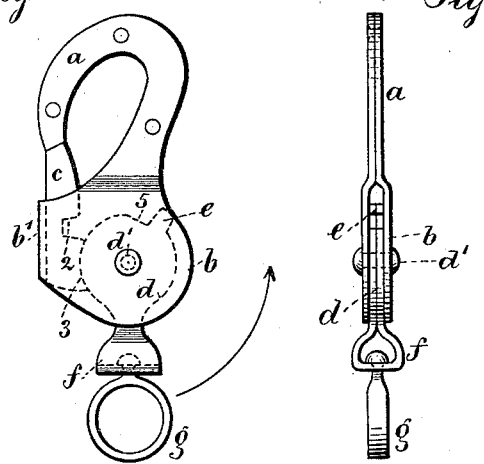
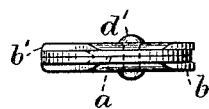
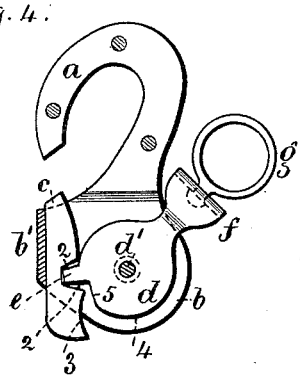
Witnesses:
J. Staib
Chas H. Smith
Inventor:
William N. Fessenden
per Lemuel W. Serrell
Atty

UNITED STATES PATENT OFFICE.

WILLIAM N. FESSENDEN, OF CANDOR, NEW YORK.

SNAP-HOOK.

SPECIFICATION forming part of Letters Patent No. 398,599, dated February 26, 1889.

Application filed July 2, 1888. Serial No. 278,777. (No model.)

*To all whom it may concern:*

Be it known that I, WILLIAM N. FESSENDEN, of Candor, in the county of Tioga, in the State of New York, have invented an Improvement in Snap-Hooks, and the following is declared to be a description of the same.

My present invention relates to a lock snap-hook, and such snap-hooks have been made heretofore, and the same have consisted of a hook, a gate pivoted to swing to and from the entrance to the hook, and a cam has been formed with said gate and projecting therefrom, and this cam and gate have been operated by a lever provided with a recess and a shoulder, and the movement of the lever has operated the projecting cam of the gate to open and close said gate.

My invention consists in a lock snap-hook having a sliding gate that is adapted to move up to and away from the entrance to the hook, and I provide a pivoted lever having a stud, the movement of which lever engages the stud with a recess in the sliding gate, the gate being thereby automatically moved with the movement of the lever.

In the drawings, Figure 1 is an elevation of my improved snap-hook, dotted lines representing the parts within the shank. Fig. 2 is an elevation of the same edgewise. Fig. 3 is a plan, and Fig. 4 is an elevation, of the operating parts sectionally through the bent part of the shank.

$a$ represents the hook portion, $b$ the shank, and $b'$ the bent edge of the shank, these parts by preference being stamped up out of a single sheet of metal, the finished hook and shank being of a double thickness of metal, the edge $b'$ of the shank joining the two parts which form the hook and the hollow shank, the parts forming the hook being riveted together.

$c$ represents the sliding gate having a recess, 2, and a curved portion at 3, the vertical edge or back of the gate moving upon and within the bent edge $b'$ of the shank. $d$ represents the lever pivoted at $d'$ to the pin, which passes through the two-part shank, and the ends of said pin are riveted up to place. The lever $d$ is preferably of a double thickness of metal, the connecting portion of which forms the loop end $f$, and lever $d$ is made with an edge, 4, which is the arc of a true circle, the pivot $d'$ being the center thereof, and there is a stud, at $e$, projecting from the edge of the lever, and a portion of the edge of said lever, at 5, is preferably slightly flattened, and there is a swivel, $g$, connected to the loop end $f$ and a chain, cord, or strap of any desired form can be attached to this swivel $g$.

In Fig. 1 the parts are represented in their normal position, the sliding gate $c$ being in its elevated position up to the entrance of the hook $a$, in which position the snap-hook is adapted to be fastened to any desired object, and is locked because the curved position of the gate at 3, agreeing exactly with the curved portion 4 of the lever $d$, cannot be pushed down out of place from within the shank of the hook, and when it may be desired to disengage the snap-hook from the object to which it may be connected the lever $d$ is swung around into the position shown in Fig. 4, the act of moving the lever in this way also moving the gate automatically, the stud $e$ of the lever engaging the recess at 2 upon the sliding gate and moving the gate down into the position shown in Fig. 4, and opening the entrance to the hook.

It is apparent that the sliding gate cannot fall out of the shank because it is held at each side by the portions of the shank at one edge by the bent edge $b'$ of the shank, and at the other edge either by the curved portions 3 4, as in Fig. 1, or the stud $e$ and recess 2, as in Fig. 4.

I claim as my invention—

1. The combination, with the hook and shank, of a sliding gate having a vertical back edge and adapted to move lengthwise through the shank up to and away from the entrance to the hook, and a lever pivoted to the shank and adapted by its movement to lock the sliding gate and to automatically move the same down, substantially as set forth.

2. The combination, with the moving gate and a pivoted operating-lever, of the hook $a$ and shank $b$, stamped up to shape of one piece of metal, and connected together as a double thickness, there being a bent edge to the shank at $b'$, said bent edge connecting the parts forming the shank and hook, and acting as a guide to the moving gate, substantially as set forth.

3. The combination, with the hook $a$ and shank $b$, having a bent edge, $b'$, of a sliding gate, $c$, having a recess at 2, and curved portion 3, the lever $d$, pivoted at $d'$ in the shank, and having an edge, 4, which is the arc of a circle from the pivot $d'$, and a stud, $e$, the loop end $f$, and swivel $g$, the said gate moving automatically with the turning of the lever on its pivot, substantially as and for the purposes set forth.

4. The combination, in a snap-hook, with a moving gate and a swivel for attaching the chain or strap, of a hook and shank stamped up for a single piece of metal and bent to shape, a lever pivoted to the shank for operating the gate, said lever also being stamped up from a single piece of metal and bent to shape, and a loop end formed by the connecting portion of the metal of the lever, substantially as set forth.

Signed by me this 28th day of June, 1888.

WM. N. FESSENDEN.

Witnesses:
J. THOMPSON,
F. W. SMITH.